2,920,974

METHOD OF PREPARING A FINELY-DIVIDED ALUMINA-SILICA PIGMENT

Edward M. Allen, Doylestown, Ohio, assignor to Columbia-Southern Chemical Corporation, Allegheny County, Pa., a corporation of Delaware No Drawing. Application February 15, 1957
Serial No. 640,347

10 Claims. (Cl. 106—288)

This invention relates to the preparation of finely divided aluminum silicate-silica compositions especially suitable for use as rubber reinforcing pigments and paper opacifying agents.

Now it has been discovered that aluminum silicate-silica compositions which are particularly effective rubber reinforcing pigments and paper opacifying agents are prepared by reacting an aluminum salt with a mixture of an alkaline earth metal silicate and silica containing at least five moles of $SiO_2$ per mole of alkaline earth metal oxide. In accordance herewith, an alkaline earth metal silicate such as calcium silicate is partially reacted with an acid which forms a water soluble alkaline earth metal salt to extract one-fourth to three-quarters of the alkaline earth metal and the resulting mixture of alkaline earth metal silicate and silica is reacted with an aluminum salt, the anion of which forms a water soluble alkaline earth metal salt. The resulting pigmentary products are comprised of precipitated silica and aluminum silicate having quite high $SiO_2$ to $Al_2O_3$ molecular ratios, ranging upwardly of 7, depending upon the amount of acid used. When recovered in essentially pure state, these products are white, soft, pulverulent, finely divided, amorphous pigments.

Alkaline earth metal salts soluble to the extent of at least 2 or 3 grams per liter of water are to be regarded as water soluble for the herein intended purposes, it being understood that sufficiently dilute aqueous systems are employed consistent with permitting the alkaline earth metal salt in question to dissolve completely or substantially completely.

More particularly, a finely divided alkaline earth metal silicate, e.g. $MO(SiO_2)_x$ where M is an alkaline earth metal and $x$ is a value of 2 to 5 inclusive, is partially reacted with an acid such as hydrochloric or sulfuric acid. Sufficient acid is employed to extract 25 to 75 percent of the alkaline earth metal oxide (MO, as represented in the foregoing equation) in the silicate. By virtue of this extraction, finely divided, amorphous silica is precipitated and a composition results which includes unreacted alkaline earth metal silicate and silica. The water soluble salts such as calcium chloride (when hydrochloric acid is reacted with calcium silicate) are easily removed as by water washing, if desired, or are leached out in the reaction medium by its dilute nature.

This composition of finely divided, amorphous silica and calcium silicate or like alkaline earth metal silicate contains 6 or more moles of $SiO_2$ per mole of CaO. Sufficient aluminum salt such as aluminum sulphate is reacted therewith to replace substantially all the CaO with $Al_2O_3$ thus giving a composition of precipitated, amorphous silica and aluminum silicate having a high $SiO_2$ to $Al_2O_3$ molecular ratio greater than 7 and more frequently between 10 and 50. Little, if any, residual CaO is usually present in this aluminum silicate-silica (alumina-silica) composition, although some minor residual amounts may be encountered, e.g. less than 5 percent by weight basis the $Al_2O_3$ content of the composition.

In typical performance of this invention, a water soluble acid such as hydrochloric acid is mixed and reacted with an aqueous slurry of calcium silicate having the composition $CaO(SiO_2)_x$ wherein $x$ is a value of 2 to 5, and most appropriately 3 to 5, to extract between 25 and 75 percent of the CaO as calcium chloride and precipitate finely divided, amorphous silica. Using between 25 and 75 percent of the stoichiometric quantity of such acid, it will be understood achieves this end. This silica-calcium silicate mixture typically contains from 6 to 15 moles of $SiO_2$ per mole of CaO.

Besides hydrochloric acid, other acids, preferably water soluble acids, which form water soluble alkaline earth metal salts including nitric acid, acetic acid, nitrous acid, and the like, are suitable for this purpose. Because the alkaline earth metal salts formed by these acids are highly water soluble, they are especially suitable. However, acids which form alkaline earth metal salts soluble to the extent of at least 2 or 3 grams per liter of water are useful. In this category are sulfuric acid, sulfurous acid and any of their anhydrides that exist such as sulfur dioxide and sulfur trioxide. With such acids, the aqueous slurry in which the reaction is conducted is advisedly of sufficient dilution to dissolve substantially all of the alkaline earth metal salt provided as a consequence of the reaction.

To efficiently provide the desired calcium silicate-silica composition, at least 90 percent and preferably all or substantially all of the alkaline earth metal salt is dissolved in the aqueous medium. Depending upon the particular acid, the degree of water dilution of the slurry is varied to insure the presence of sufficient water to substantially dissolve the resulting alkaline earth metal salt. Less desirable, but also operative, is the use of a less diluted reaction medium, followed by extensive water washing of this composition or the final aluminum silicate-silica composition.

This results in an aqueous slurry of precipitated, finely divided, amorphous silica and calcium silicate containing dissolved calcium salts. In a preferred procedure, the solid components of the slurry, e.g. silica and calcium silicate, are recovered as by filtration, centrifugation, settling and decantation or comparable means, and may be water washed in the event the alkaline earth metal salt is of somewhat low water solubility, to insure removal of substantially all of the salts.

This slurry of precipitated silica and calcium silicate, or more aptly the separated solids thereof, is reacted in aqueous media with an aluminum salt, notably aluminum sulphate, in sufficient amount to react (extract or neutralize) substantially completely with the calcium silicate. As a consequence, the resulting slurry contains a precipitated mixture of silica and aluminum silicate along with dissolved alkaline earth metal salt such as calcium sulphate (when aluminum sulphate is used). For optimum operation, the reaction medium is dilute enough to dissolve essentially all of the calcium sulphate. Alternatively, the precipitated silca-aluminum silicate pigment may be separated from the slurry as by filtration and thence water washed to remove the calcium sulphate.

The precipitated aluminum silicate-silica composition is preferably free for practical purposes from calcium oxide although it will be understood the process may be conducted in a manner such that CaO is present in concentrations so small as to be regarded as inconsequential, e.g. less than 5 percent by weight of the aluminum oxide as $Al_2O_3$ present in the aluminum silicate-silica composition.

Calcium silicate reacts with aluminum sulphate in the ratio of 3 moles of calcium silicate per mole of aluminum sulphate according to the general equation:

$$3CaO(SiO_2)_x + Al_2(SO_4)_3 \rightarrow Al_2O_3(SiO_2)_{3x} + 3CaSO_4$$

$x$ denoting a value of 2 to 5. Thus, the aluminum silicate in these compositions contain $SiO_2$ and $Al_2O_3$ in the molecular ratio of from 6 to 1 upwardly to 15 to 1. Overall, because of the silica provided during the acid neutralization, these compositions contain even higher $SiO_2$ to $Al_2O_3$ molecular ratios.

Besides aluminum sulphate, other typical water soluble aluminum compounds having anions which provide water soluble alkaline earth metal salts, e.g. salts having solubility above 2 or 3 grams per liter, include aluminum chloride, aluminum bromide, aluminum nitrate, and the like.

Quite important to rubber reinforcing qualities of the aluminum silicate-silica composition is the particle size of the aluminum silicate and the character of the silica. For most purposes, this material should have an average ultimate particle size less than 1 micron and preferably not substantially in excess of 0.1 micron. Such particles are in the form of flocs or loosely bound aggregates usually ranging up to 10 microns in size which can be broken up upon milling with rubber. These flocs, under high magnification, resemble grape clusters.

To a material degree, this particle size may be controlled by the particle size of the calcium silicate or other alkaline earth metal silicate treated. To obtain an aluminum silicate-silica composition possessed of highest rubber reinforcing properties, the alkaline earth metal silicate should have an average ultimate particle size below about 0.1 micron (between 0.01 to 0.1 micron) as determined by an electron microscope. Most such calcium silicates are of 10 to 150 or 200 square meters per gram in surface area.

Precipitation of calcium or other alkaline earth metal silicate in finely divided state may be accomplished by mixing a stream of aqueous calcium chloride (or other chloride of an alkaline earth metal) solution with a stream of aqueous sodium silicate solution under conditions which subject the mixture to a high degree of turbulence and almost instantaneous mixing. The amount of reactants in the respective streams is proportioned to obtain calcium silicate in the desired concentration and to establish an excess of calcium chloride over the stoichiometric quantity required to react with a silicate. One effective way to produce the required turbulence is to introduce the two feed streams together into a central area of a centrifugal pump. In this case, the agitation of the mixture is effected as the introduced streams of reactants are thrown radially outward by the pump rotor.

For most purposes, it is desirable to limit the feed of calcium chloride and alkali metal silicate solution entering the pump to an amount below the capacity of the pump. For example, if the pump is capable of discharging 100 gallons per minute, then the amount of reacting solutions supplied to the pump is held to at least 10 percent below and usually to 35 percent or more below this amount. This apparently affords a greater degree of agitation of the reaction solution and insures production of a calcium silicate having the desired particle size. Further, it is desirable to adjust the concentration of silicate and calcium chloride in the solution so that calcium silicate will be prepared in the concentration approximately equal to about 5 to 250 grams of calcium silicate per liter of solution in slurry. Moreover, in order to insure production of a calcium silicate having an extremely small particle size, an alkali metal silicate having the composition $Na_2O(SiO_2)_x$, where $x$ is a number not less than 2 nor more than 4, is preferably used. This produces a calcium silicate having the composition $CaO(SiO_2)_x$, where $x$ is a number not less than 2 nor more than about 4.

Other alkaline earth metal silicates which may be used in lieu of calcium silicate are the corresponding barium, strontium, and magnesium silicates. These alkaline earth metal silicates are prepared by reacting the corresponding alkaline earth metal chloride with sodium silicate or other alkali metal silicate in the above described manner. Moreover, calcium silicate may be reacted with the corresponding metal chlorides of these metals and the resulting mixed alkaline earth metal silicate may be treated in accordance with this invention.

According to a further embodiment of the invention, a co-precipitated calcium silicate-silica composition suitable for reaction with an aluminum salt may be prepared by reacting an alkali metal silicate with a water soluble salt of calcium (or similar alkaline earth metal salt) in the presence of an acid which forms a water soluble alkaline earth metal salt. Calcium silicate-silica mixtures suitable for preparing these aluminum silicate-silica compositions may be prepared by simultaneously introducing sodium silicate, hydrochloric acid and calcium chloride into an aqueous reaction medium. The amount of hydrochloric acid, or like acid, is adjusted such that there is sufficient acid to react with from 25 to 75 percent of the calcium silicate which would otherwise be produced in the absence of the acid.

Alkaline earth metal salts including magnesium chloride, barium chloride, magnesium nitrate, strontium chloride and the like are suitable besides calcium chloride. In lieu of sodium silicate, preferred because of its commercial availability and ease of handling, other alkali metal silicates such as potassium silicate are useful.

The pigment hereby produced may be treated with a coating agent in order to improve certain of its properties. As an example, the pigment may be treated with a coating agent such as non-drying oils, for example, coconut oil, corn oil, lard, lard oil, sperm oil or tallow, and other coating agents, such as oleic acid, stearic acid, tall oil acids, and similar non-drying acids, or the alkali metal or ammonium soaps of these acids. The coating agent may be incorporated simply by forming an aqueous slurry of the aluminum silicate-silica composition and adding the coating agent thereto. Following the addition, the mixture may be agitated, filtered and dried in the usual manner.

The aluminum silicate-silica compositions provided by the present process are found to be very useful as rubber pigments, particularly for reinforcement of elastomers or rubber compositions, including natural rubber compositions, synthetic rubber compositions, such as butadiene-styrene copolymers known as "GR–S" rubber, butadiene-acrylonitrile polymers, chloroprene rubber, butyl rubber, and the like polymers of butadiene-1,3-isoprene, 2-chlorobutadiene-1,3 and 2,3-dimethyl butadiene-1,3 and copolymers thereof with styrene, acrylonitrile, and the like, as well as polyvinyl chloride, vinyl chloride-vinyl acetate copolymers, etc., and mixtures of natural and synthetic rubbers. The reinforced compositions so provided exhibited superior qualities over those obtained where calcium silicate is used. The amount of such pigment incorporated in these rubber or elastomer compositions generally is about 10 to 100 parts by weight per 100 parts by weight of elastomer or rubber composition.

The invention may be more fully understood by reference to the following examples:

*Example I*

Streams of aqueous sodium silicate solution containing 100 grams per liter of $SiO_2$ as $Na_2O(SiO_2)_{3.36}$ and calcium chloride solution containing 100 grams per liter of calcium chloride and 30 to 40 grams per liter of sodium chloride are fed directly into the central area of a centrifugal pump. The rates of flow are adjusted so that calcium chloride is approximately 10 percent in excess of the stoichiometric quantity required for reaction and so that the amount of liquids supplied to the pump are about 25 percent below the output capacity of the pump. In consequence, the solution was subjected to turbulent intermixing in the pump.

The calcium silicate thus produced has an average ultimate particle size of about 0.03 to 0.05 micron and a surface area of approximately 80 square meters per gram.

The slurry of calcium chloride thus produced is filtered and the filter cake is reslurried in water to provide a slurry containing 7.1 grams per liter of calcium silicate having the composition $CaO(SiO_2)_{3.36}$. To a 30 liter portion of this slurry, some 48 cubic centimeters of aqueous hydrochloric acid containing 28 percent by weight of hydrogen chloride (15 grams of hydrogen chloride) is added slowly. This is sufficient hydrochloric acid to react with (or neutralize) 25 percent of the calcium silicate.

Thereafter, a 0.5 molar aqueous aluminum sulphate solution containing 136 grams of $Al_2(SO_4)_3 \cdot 18H_2O$ is gradually added while agitating the slurry. This slurry is filtered and washed with tap water. The resulting product is a finely divided, precipitated, flocculent, amorphous alumina-silica or aluminum silicate-silica mixture having an ultimate particle size of 0.01 to 0.05 micron and a composition containing 11.2 moles of $SiO_2$ per mole of $Al_2O_3$.

Example II

Using another 30 liter portion of the slurry provided in Example I by reslurrying the calcium silicate filter cake, approximately 93 cubic centimeters of hydrochloric acid containing 28 percent by weight hydrogen chloride (approximately 30 grams of hydrogen chloride) is added to the slurry. This quantity of hydrochloric acid is sufficient to react with 50 percent of the calcium silicate. To the resulting slurry is added as a 0.5 molar aqueous solution of aluminum sulphate containing 93 grams of $Al_2(SO_4)_3 \cdot 18H_2O$. After filtration of the slurry, followed by water washing the filter cake and then drying the product in an oven at 105° C. for 24 hours, a finely divided, amorphous, pigmentary alumina-silica composition is provided. This composition contains 14.4 moles of $SiO_2$ per mole of $Al_2O_3$.

Example III

To another 30 liter portion of the reslurried calcium silicate prepared as described in Example I and containing 7.1 grams per liter of calcium silicate of the composition $CaO(SiO_2)_{3.36}$ approximately 150 cubic centimeters of hydrochloric acid containing 28 percent by weight hydrogen chloride (equivalent to 45 grams of hydrogen chloride, sufficient to react with approximately 75 percent of the calcium silicate) is added gradually. After the reaction of hydrochloric acid and calcium silicate is permitted to reach its conclusion, a 0.5 molar aqueous solution of aluminum sulphate containing 46 grams of $Al_2(SO_4)_3 \cdot 18H_2O$ is added. The slurry is then filtered, the filter cake washed with tap water and dried at 105° C. for 24 hours. This product is a finely divided, amorphous, pigmentary, white alumina-silica composition containing 19 moles of $SiO_2$ per mole of $Al_2O_3$.

Example IV

To another 30 liter portion of the slurry provided in Example I by reslurrying the calcium silicate is added approximately 93 cubic centimeters of hydrochloric acid containing 28 percent by weight hydrogen chloride (sufficient hydrochloric acid to react with 50 percent of the calcium silicate). Thereafter, 18.7 grams of aluminum chloride is added to the slurry while stirring. Afterwards, the slurry is filtered, the filter cake washed with tap water and then dried at 105° C. for 24 hours. There results a finely divided, amorphous, pigmentary, white aluminum silicate-silica (alumina-silica) composition containing 11.2 moles of $SiO_2$ per mole of $Al_2O_3$.

Example V

Example II is duplicated, substituting for the hydrochloric acid a dilute aqueous sulfuric acid solution containing 41 grams of $H_2SO_4$. The product thus prepared corresponds to that provided by Example II.

It is to be understood that the process described in the foregoing examples may be conducted by substituting in lieu of hydrochloric acid other suitable water soluble acids which form water soluble alkaline earth metal salts, e.g. salts having a water solubility of at least 2 or 3 grams per liter of water. Thus, nitric acid and acetic acid are suitable. When the aqueous slurry of calcium silicate is adequately dilute, sulfuric acid, sulfurous acid and the like are useful as hereinbefore explained.

The term acid as herein used in describing this invention is limited to acids or acid salts having cations which do not form a water insoluble metal oxide coprecipitate with $SiO_2$ in the reaction medium. Thus, besides acids (materials having hydrogen cations) acid salts such as ammonium chloride are intended. Accordingly, the term acid refers to acids or acid salts having cations or anions which do not form water insoluble products under the conditions of reaction.

It will further be appreciated that the process may be performed in widely varying temperatures. Usually employed are temperatures above 10° C. and below 100° C., more particularly 20° C. to 50° C. However, any temperature at which the slurry remains fluid is suitable, e.g. below 0° C. Temperatures above the boiling point of the reaction medium are not often used. However, with ammonium chloride, a boiling slurry is valuable as a means for driving off ammonia. By recourse to superatmospheric pressures, even temperatures above boiling, e.g. above about 100° C. may be used.

In lieu of calcium silicate, other alkaline earth metal silicates such as magnesium, barium, strontium silicates are useful for performing the processes described in the above examples.

Calcium silicate or like alkaline earth metal silicate need not be isolated from the slurry in which it has been precipitated by reaction of alkali metal silicate and alkaline earth metal salt prior to reaction with acid. The slurry in which the calcium silicate is prepared, provided it is adequately dilute for the purposes of insuring the solubility of the respective salts formed during each of the steps of the process, may be appropriately used. Water soluble aluminum salt may be added directly to the slurry of calcium silicate-silica produced by treating the calcium silicate with an acid such as hydrochloric acid with the proviso that adequate dilution such that the salts produced as a consequence of the formation of the alumina-silica composition are adequately dissolved.

This application is a continuation-in-part of my earlier filed applications, Serial No. 355,865, filed May 18, 1953, now United States Letters Patent 2,786,777; Serial No. 473,057, filed December 3, 1954, now United States Letters Patent 2,786,776; and Serial No. 616,595, filed October 18, 1956.

While the present invention has been described with reference to specific details of certain embodiments, it is not intended that the invention be construed as limited thereto except insofar as such limitations appear in the appended claims.

I claim:

1. A method which comprises partially reacting in aqueous medium 25 to 75 percent of finely divided alkaline earth metal silicate with a water soluble acid the anion of which forms a water soluble alkaline earth metal salt whereby to form an alkaline earth metal silicate-silica composition, reacting said composition in aqueous medium with a water soluble aluminum salt, the anion of which forms a water soluble alkaline earth metal salt, the amount of said aluminum salt being sufficient to replace substantially all of the alkaline earth metal oxide of the said composition with $Al_2O_3$ whereby to produce an alumina-silica composition having an average ultimate particle size of less than 1 micron.

2. A method which comprises partially reacting in aqueous medium 25 to 75 percent of finely divided calcium silicate with a water soluble acid, the anion of which forms a water solube calcium salt whereby to form a calcium silicate-silica composition, reacting the composition in aqueous medium with a water soluble aluminum salt, the anion of which forms a water soluble calcium salt, the amount of said aluminum salt being sufficient to replace substantially all of the calcium oxide of the calcium silicate-silica composition with $Al_2O_3$ thereby to form an alumina-silica composition having an average ultimate particle size of less than 1 micron.

3. A method which comprises partially reacting finely divided alkaline earth metal silicate in aqueous medium with a quantity of a water soluble acid equivalent to 25 to 75 percent of stoichiometric whereby to form an alkaline earth metal silicate-silica composition, the anion of said acid forming a water soluble alkaline earth metal salt, reacting said composition in aqueous medium with a water soluble aluminum salt, the anion of which forms a water soluble alkaline earth metal salt, the amount of said aluminum salt being sufficient to replace substantially all of the alkaline earth metal oxide in said composition with $Al_2O_3$ whereby to produce an alumina-silica pigmentary composition having an average ultimate particle size of less than 1 micron.

4. The method of claim 3 wherein the aluminum salt is aluminum sulphate.

5. The method of claim 3 wherein the aluminum salt is aluminum chloride.

6. A method which comprises partially reacting finely divided calcium silicate in aqueous medium with a quantity of a water soluble acid equivalent to 25 to 75 percent of stoichiometric, the anion of said acid forming a water soluble calcium salt, whereby to form a calcium silicate-silica composition, reacting said composition in aqueous medium with a water soluble aluminum salt the anion of which forms a water soluble calcium salt, the amount of said aluminum salt being sufficient to replace substantially all of the calcium oxide of said calcium silicate-silica composition with $Al_2O_3$ whereby to produce an alumina-silica pigmentary composition having an average ultimate particle size of less than 1 micron.

7. A method which comprises partially reacting finely divided calcium silicate containing 2 to 5 moles of $SiO_2$ per mole of CaO in aqueous medium with a quantity of a water soluble acid equivalent to 25 to 75 percent of stoichiometric, to form a calcium silicate-silica composition, the anion of said acid forming a water soluble calcium salt, reacting said composition in aqueous medium with an amount of aluminum sulphate sufficient to replace substantially all of the calcium oxide of said calcium silicate-silica composition with $Al_2O_3$ whereby to produce an alumina-silica pigmentary composition having an average ultimate particle size of less than 1 micron.

8. A method of producing a finely divided pigmentary alumina-silica composition having an average ultimate particle size of less than 1 micron and containing at least 7 moles of $SiO_2$ per mole of $Al_2O_3$ which comprises partially reacting finely divided alkaline earth metal silicate in aqueous medium with a quantity of a water soluble acid equivalent to 25 to 75 percent of stoichiometric whereby to form an alkaline earth metal silicate-silica composition, the anion of said acid forming a water soluble alkaline earth metal salt, and reacting said alkaline earth metal silicate-silica composition in aqueous medium with a quantity of a water soluble aluminum salt sufficient to replace substantially all of the alkaline earth metal oxide in said composition with $Al_2O_3$, the anion of said soluble aluminum salt forming a water soluble alkaline earth metal salt.

9. A method of producing a finely divided pigmentary alumina-silica composition having an average ultimate particle size of less than 1 micron and containing between 10 and 50 moles of $SiO_2$ per mole of $Al_2O_3$ which comprises partially reacting finely divided alkaline earth metal silicate containing 2 to 5 moles of $SiO_2$ per mole of alkaline earth metal oxide in aqueous medium with a quantity of water soluble acid sufficient to extract 25 to 75 percent of the alkaline earth metal oxide of the silicate whereby to form an alkaline earth metal silicate-silica composition containing 6 to 15 moles of $SiO_2$ per mole of alkaline earth metal oxide, the anion of said acid forming a water soluble alkaline earth metal salt, and reacting said alkaline earth metal silicate-silica composition in aqueous medium with a quantity of water soluble aluminum salt sufficient to replace substantially all of the alkaline earth metal oxide in said composition with $Al_2O_3$ and thereby forming an aluminum-silicate composition containing 10 to 50 moles of $SiO_2$ per mole of $Al_2O_3$, the anion of said soluble aluminum salt forming a water soluble alkaline earth metal salt.

10. The method of claim 9 wherein the alkaline earth metal silicate is calcium silicate and the alkaline earth metal oxide is calcium oxide.

References Cited in the file of this patent

UNITED STATES PATENTS

| | | |
|---|---|---|
| 2,472,830 | Hunter | June 14, 1949 |
| 2,498,353 | Bierce | Feb. 21, 1950 |
| 2,686,731 | Wainer | Aug. 17, 1954 |
| 2,698,256 | Shea et al. | Dec. 28, 1954 |
| 2,739,073 | Bertorelli | Mar. 20, 1956 |
| 2,786,758 | Taylor | Mar. 26, 1957 |
| 2,786,776 | Allen | Mar. 26, 1957 |
| 2,786,777 | Allen | Mar. 26, 1957 |